US00RE38635E1

(19) United States
(12) Reissued Patent
Uemura

(10) Patent Number: US RE38,635 E
(45) Date of Reissued Patent: Oct. 26, 2004

(54) STAGELESSLY ADJUSTABLE TELESCOPIC WALKING STICK WITH A POSITION RETAINING DEVICE

(75) Inventor: Shinichi Uemura, Nagoya (JP)

(73) Assignee: Crystal Industrial Co., Ltd., Nagoya (JP)

(21) Appl. No.: 10/058,773

(22) Filed: Jan. 30, 2002

Related U.S. Patent Documents

Reissue of:
(64) Patent No.: 5,769,104
Issued: Jun. 23, 1998
Appl. No.: 08/866,018
Filed: May 30, 1997

(51) Int. Cl.[7] ..... A61H 3/02
(52) U.S. Cl. ..... 135/69; 135/75; 403/109.2; 403/351; 248/188.5
(58) Field of Search ..... 135/65, 69, 75, 135/139, 140, 141, 142; 403/109.1, 350, 351, 372, 109.5; 248/188.5

(56) References Cited

U.S. PATENT DOCUMENTS 3,259,407 A * 7/1966 Welt ..... 403/350
3,335,735 A * 8/1967 Colegrove et al. ..... 135/69
4,076,437 A * 2/1978 Mazzolla ..... 403/350
4,152,086 A * 5/1979 Achenbach et al. ..... 403/372
4,231,574 A * 11/1980 Williams ..... 403/350
4,238,164 A * 12/1980 Mazzolla ..... 403/109.5
4,252,137 A * 2/1981 Cohen ..... 135/69
4,419,025 A * 12/1983 Takahashi ..... 403/109.4
4,582,079 A * 4/1986 Fields ..... 135/75
4,659,125 A * 4/1987 Chuan ..... 403/351
4,809,725 A * 3/1989 Champigny ..... 135/75
4,895,471 A * 1/1990 Geltz et al. ..... 403/109.8
5,487,529 A * 1/1996 Newville ..... 403/109.5

FOREIGN PATENT DOCUMENTS

JP 2034540 * 5/1995

* cited by examiner

*Primary Examiner*—Wannie S. Yip
(74) *Attorney, Agent, or Firm*—Hoffman, Wasson & Gitler, PC

(57) ABSTRACT

A stagelessly adjustable telescopic waking stick having a position retaining device is made up of an upper pipe and a lower pipe that are telescopically adjusted so as to permit the walking stick to be extended to any length within a limited range and be firmly retained at any selected length by the position retaining device so as to permit the telescopic walking stick to be suitable to people of various physical sizes.

1 Claim, 11 Drawing Sheets

STAGELESSLY ADJUSTABLE TELESCOPIC WALKING STICK WITH A POSITION RETAINING DEVICE

Matter enclosed in heavy brackets [ ] appears in the original patent but forms no part of this reissue specification; matter printed in italics indicates the additions made by reissue.

BACKGROUND OF THE INVENTION

The present invention relates to a stagelessly adjustable telescopic walking stick having a position retaining device so as to permit the walking stick to be extended to any length within a limited range and be firmly retained at any selected length so as to permit the telescopic walking stick to be used by people of various physical sizes.

In general, walking sticks are manufactured in a number of fixed sizes and people of different physical sizes must choose a proper walking stick best meet their physical sizes. Such way of producing walking sticks of fixed sizes make the stocks in the warehouse of a factory or stores piled up easily.

To solve the problem, length adjustable walking sticks have been developed for many years. The conventional adjustable walking sticks are designed to have an upper pipe and a lower pipe having a plurality of evenly spaced retaining holes defined thereon. The upper pipe is equipped with a pair of retractable locking buttons which can be in selective engagement with the retaining holes of the lower pipe, making the walking stick adjustable in length.

However, this prior art walking stick has a number of inherent disadvantages given as below:

1. The evenly spaced retaining holes on the lower pipe are not defined in such a manner that a precise length can be easily obtained in one aspect; and the operation on the retaining buttons and the selection of proper retaining holes are relatively difficult for the aged people in another aspect.

2. The disposition of the retaining holes on the lower pipe makes the strength of the lower pipe weakened and the surface of the same spoiled.

3. The drilling of the retaining holes on the lower pipe makes the production of a walking stick complex and the manufacturing cost thereof relatively high.

4. A personal walking stick is usually used only by an individual constantly and the retaining holes are almost fixed without shift, rendering easy damage to the retaining holes and shortening the operation life of such a walking, stick after a period of time.

The inventor has noticed such problems associated with conventional walking sticks and came up with a stagelessly adjustable walking stick equipped with specific position retaining devices as disclosed in the present invention.

SUMMARY OF THE INVENTION

Therefore, the primary object of the present invention is to provide a stagelessly adjustable walking stick having a position, retaining device which enables a user to vary the length of the walking stick in a random manner within a limited range.

Another object of the present invention is to provide a stagelessly adjustable walking stick having a position retaining device equipped with an eccentrically driven retainer and having an expandable plastic tube having inner threads. The plastic tube is made up of two separable portions bound together by a C-shaped clamp, one portion has an eccentrically located engagement protrusion to which an eccentric circular disk is secured by a screw. A cone-shaped taper means having one end secured to one end of a lower pipe of a walking stick and having the other end provided with a threaded post which can be engaged with the inner threaded face of the plastic tube and make the taper means proceed forwardly or withdraw backwardly, resulting in the outward expansion of the clamp bound plastic tube when the lower pipe is rotated to move upwardly, making the eccentric circular disk and the eccentric retainer both housed in the upper pipe abut against the inner wall of the upper pipe respectively in such a manner that the retainer of the taper means mounted onto the end of the lower pipe can proceed forwardly to expand outwardly the plastic tube whereby the upper pipe and the lower pipe can be firmly locked together by the expanded plastic tube at a selected length.

One further object of the present invention is to provide a stagelessly adjustable walking stick having a position retaining device having an eccentric circular disk secured to an eccentrically operated retainer having an eccentric securing member for the fixing of the circular disk by a screw. The retainer has a tapered face at the top with an inner threaded tubular extension projected downwardly therefrom so that a taper means attached to the end of the lower pipe and having an outerly threaded post projected therefrom can adjustably engaged with the retainer. A plastic locking tube having a longitudinally split opening is disposed between the eccentric retainer and the taper means whereby when the eccentric circular disk and the retainer are housed in the upper pipe of a walking stick, the split plastic tube will be forced to outwardly expand to abut tightly against the inner wall of the upper pipe as a result of the taper means secured to the lower pipe proceeding forwardly due to the rotation of the lower pipe by a person. The eccentric circular disk and the eccentric retainer are designed to abut firmly against the inner wall of the upper pipe when the lower pipe is rotated to make the outerly threaded post of the taper means engaged with the innerly threaded tubular extension, making the eccentric circular disk and the eccentric retainer rotated separately to such a position that the eccentric circular disk and the eccentric retainer are in a locking abutment against the inner wall of the upper pipe, guaranting the taper means to be able to effectively proceed against the plastic locking tube to make the same outwardly expanded.

One still further object of the present invention is to provide a stagelessly adjustable walking stick having a position retaining device that is equipped with a plastic retainer cap having a tubular passage. The plastic retainer cap is divided into four symmetric portions by two orthogonally defined splitting cuts crisscrossing at the summit of the cap. The tubular passage is provided with inner threads on the wall thereof so as to permit a threaded post having a tapered end and secured to the top end of the lower pipe to be rotatably engaged with the plastic retainer cap. The innerly threaded tubular passage extends most of the plastic retainer cap with a section thereof, adjacent the four portion split top end, left blank whereby when the tapered end of the threaded post is made to move forwardly as a result of the rotation of the lower pipe, the four split portions of the plastic retainer cap are urged to outwardly expand to firmly abut against the inner wall of the upper pipe so as to lock the lower pipe in position to the upper pipe after a suitable length of the walking stick is selected.

DETAILED DESCRIPTION OF THE PREFERRED EMBODIMENTS

Figure 1:
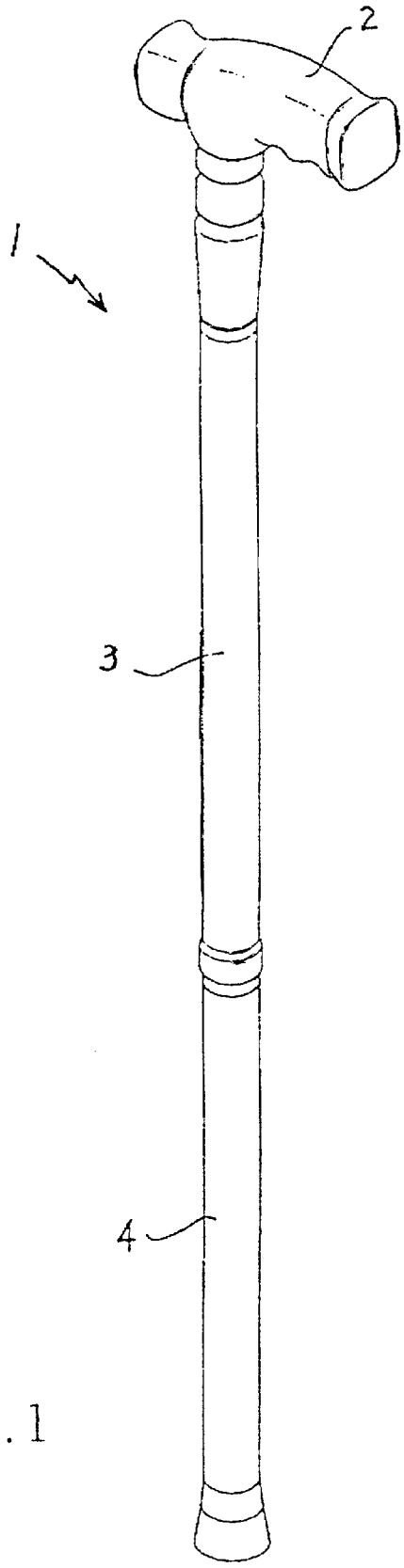
FIG. 1 is a perspective diagram showing the stagelessly adjustable walking stick of the present invention.

Referring to FIG. 1, the stagelessly adjustable walking stick 1 of the present invention comprised of a handle 2, as upper pipe 3, a lower pipe 4 is randomly extended or retracted of its lower pipe 4 within a limited range and is locked in position at a selected length with ease.

Figure 2:
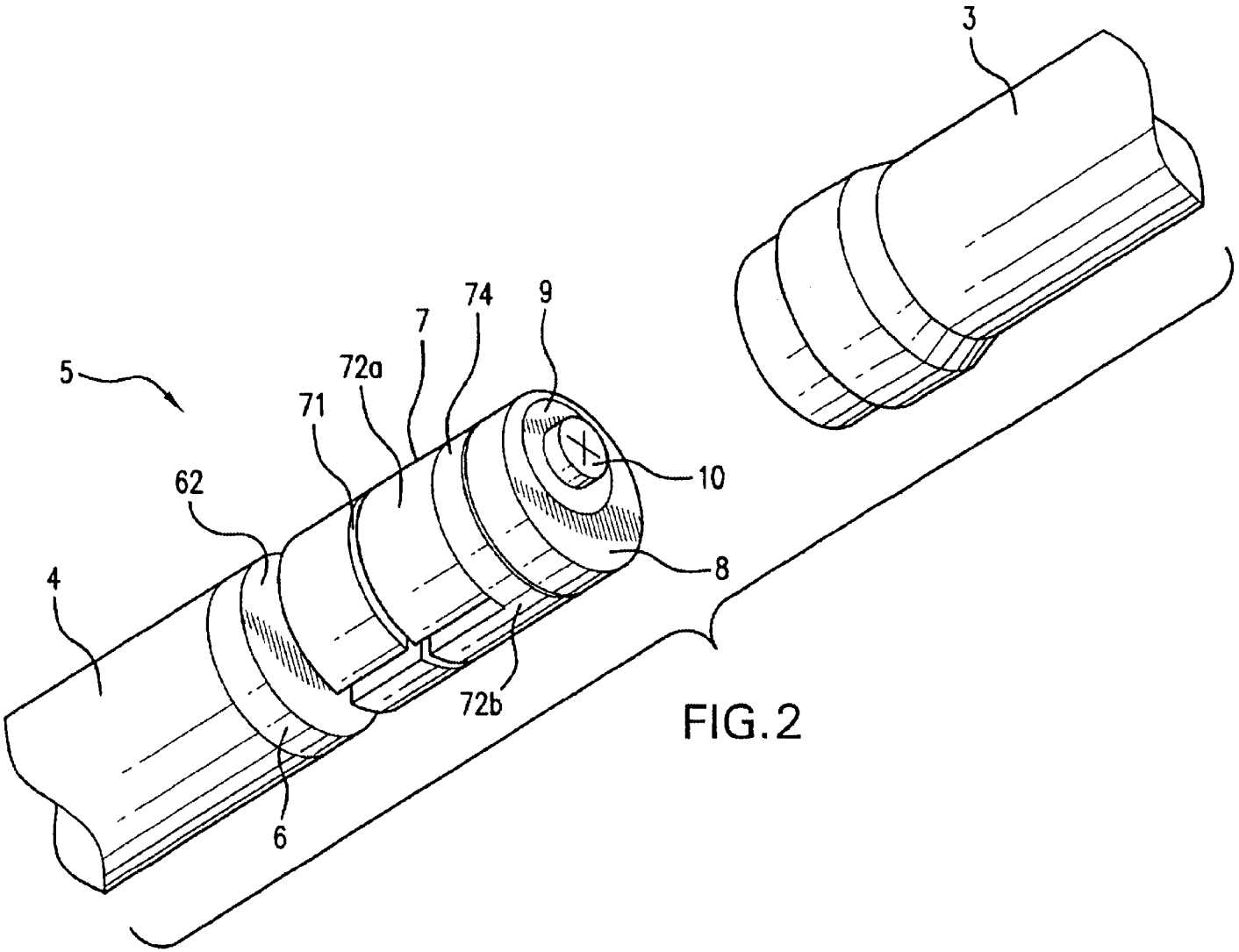
FIG. 2 is a diagram showing the assembly of the first embodiment of the present invention.
Figure 3:
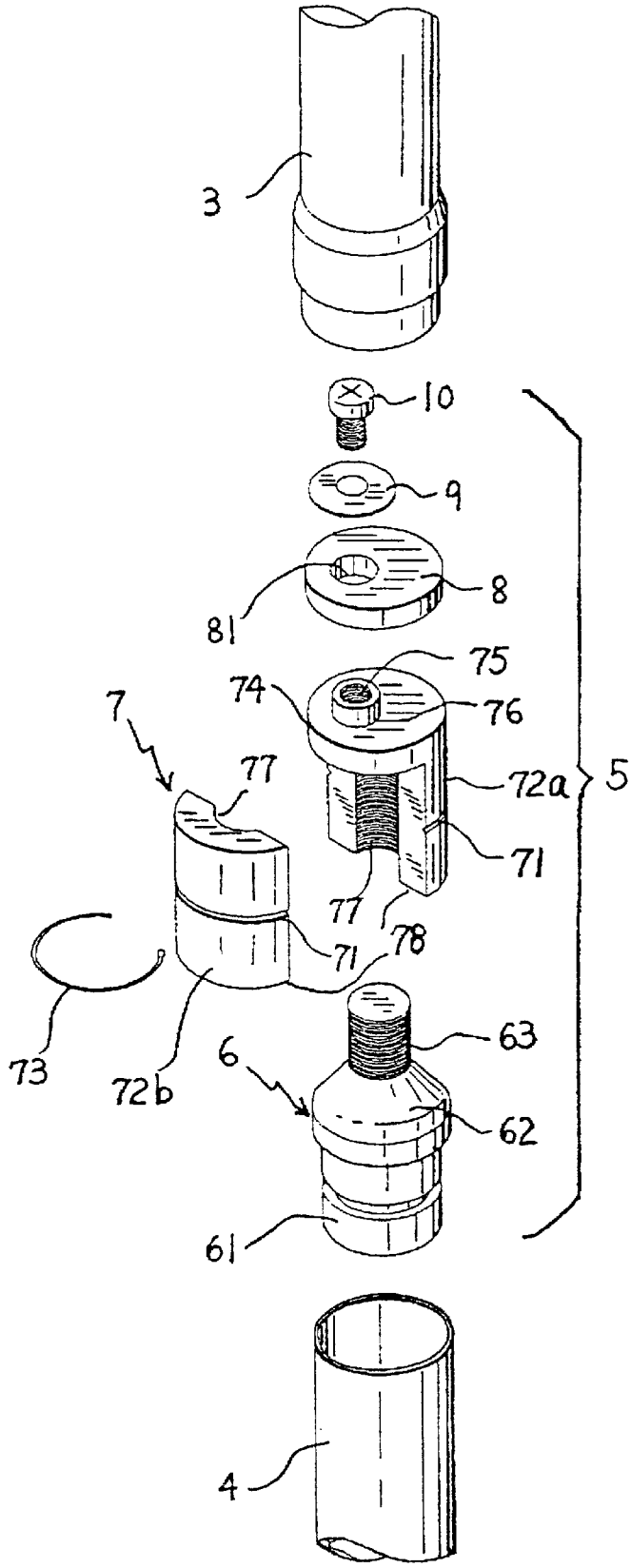
FIG. 3 is a perspective diagram showing the exploded components of the first embodiment thereof.
Figure 4:
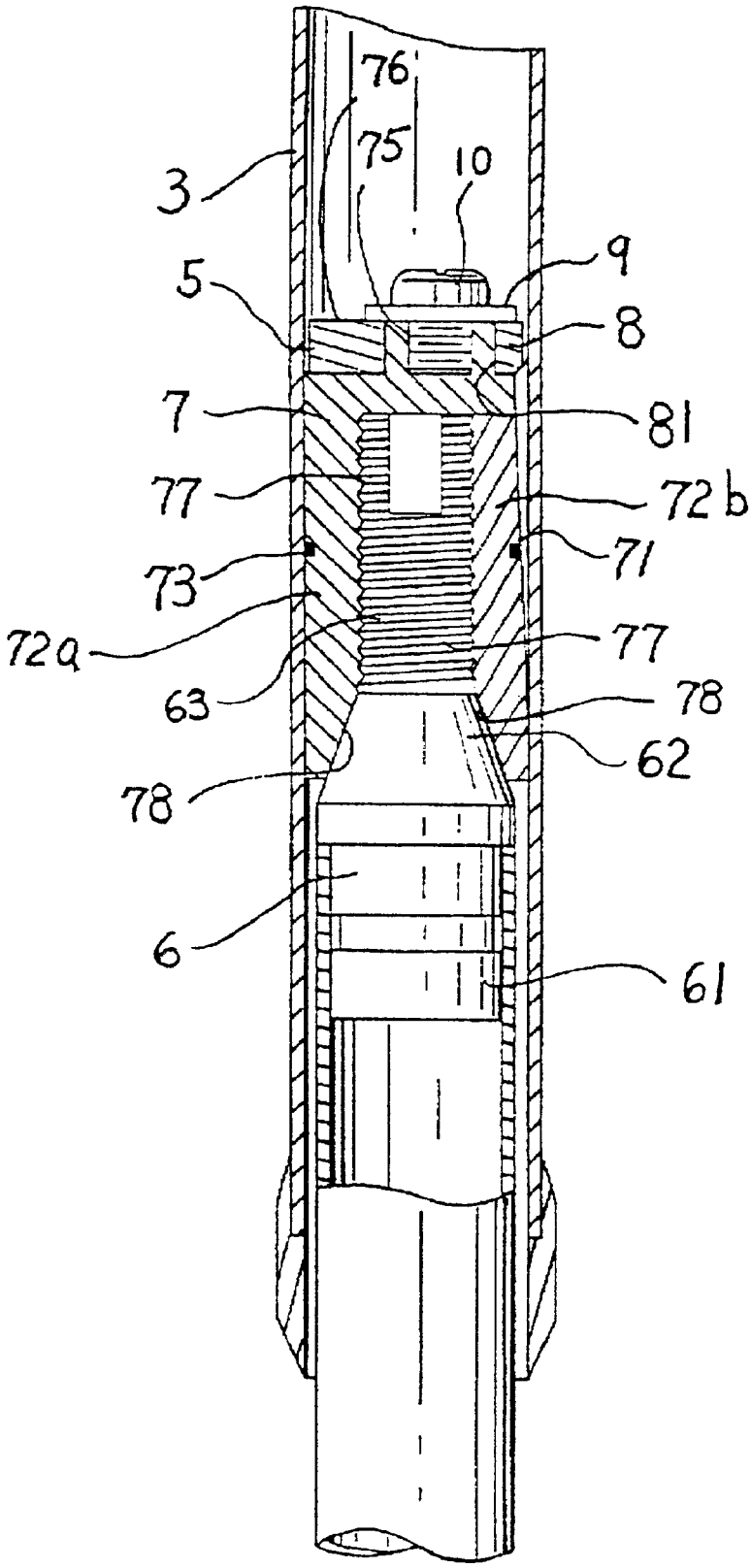
FIG. 4 is a sectional diagram showing the practical operation of the first embodiment.

In the first embodiment of the present invention as shown in FIGS. 2, 3, the walking stick 1 having a position retaining device 5 which enables a user to vary the length of the walking stick in a stageless manner. The position retaining device 5 is comprised of an retainer 7 including a round securing plate 74 in connection to a half cylindrical extension 72a, and another separated half cylindrical portion 72b in match with the cylindrical extension 72a.

Both the half cylindrical extension 72a and the half cylindrical portion 72b are provided with inner threads 77 and an outer groove 71 at the middle thereof and a tapered face 78 at one end respectively so as to form an expandable plastic tube having inner threads and a tapered bottom when the two separable portions 72a, 72b are bound together by a C-shaped clamp 73. On the top of the round securing plate 74 is disposed an eccentric engagement protrusion 76 having a screw hole 75 so as to permit a circular disk 8 having an eccentric hole 81 defined thereon to be secured by a screw 10 with a washer 9 located therebetween. A conic taper means 6 having a connection joint 61 at one end for engagement with one end of the lower pipe 64 of a walking stick and having the other end provided with a conic tapered face 62 in connection to a threaded post 63 which can be engaged with the inner threaded face 77 of the plastic tube and make the taper means 6 proceed forwardly or withdraw backwardly, resulting in the outward expansion of the clamp bound plastic tube when the lower pipe 4 is rotated to move upwardly.

Figure 5B:
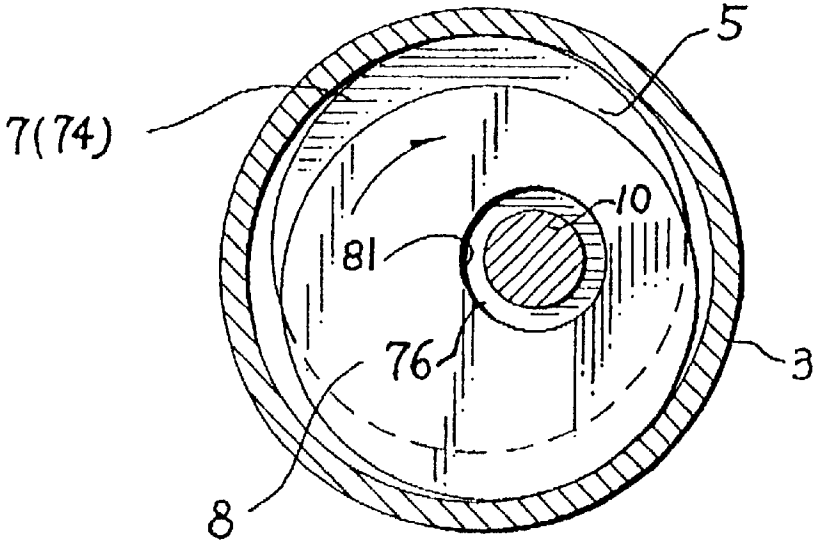
FIG. 5B is another sectional diagram showing both the eccentric circular disk and the eccentric retainer being placed in locking abutment against the inner wall of the upper pipe.
Figure 5A:
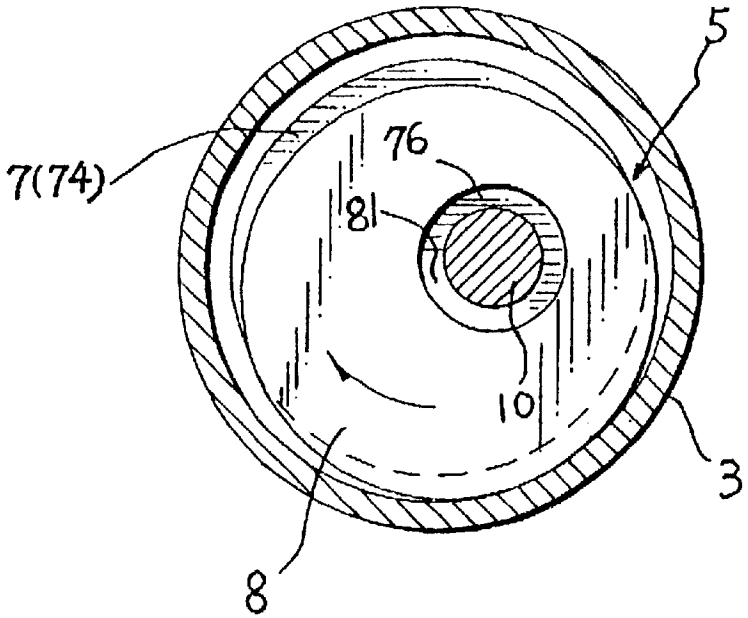
FIG. 5A is a sectional diagram showing the eccentric circular disk and the eccentric retainer being placed in a state without firm abutment against the inner wall of the upper pipe.

Referring to FIGS. 5a, 5b, in the beginning, the eccentric circular disk 8 and the round securing plate 74 of the retainer 7 are placed in leaning against the sample side of the inner face of the upper pipe; the rotation of the lower pipe 4 will make the eccentric circular disk 8 and the eccentric retainer 7 fully abut against the inner wall of the upper pipe 3 respectively in such a manner that the taper means 6 mounted onto the end of the lower pipe 4 can proceed forwardly to expand outwardly the plastic tube by the conic tapered face 62 of the taper means 6 as long as the lower pipe 4 is further rotated whereby the upper pipe and the lower pipe can be firmly locked together by the expanded plastic tube at a selected length.

Figure 6:
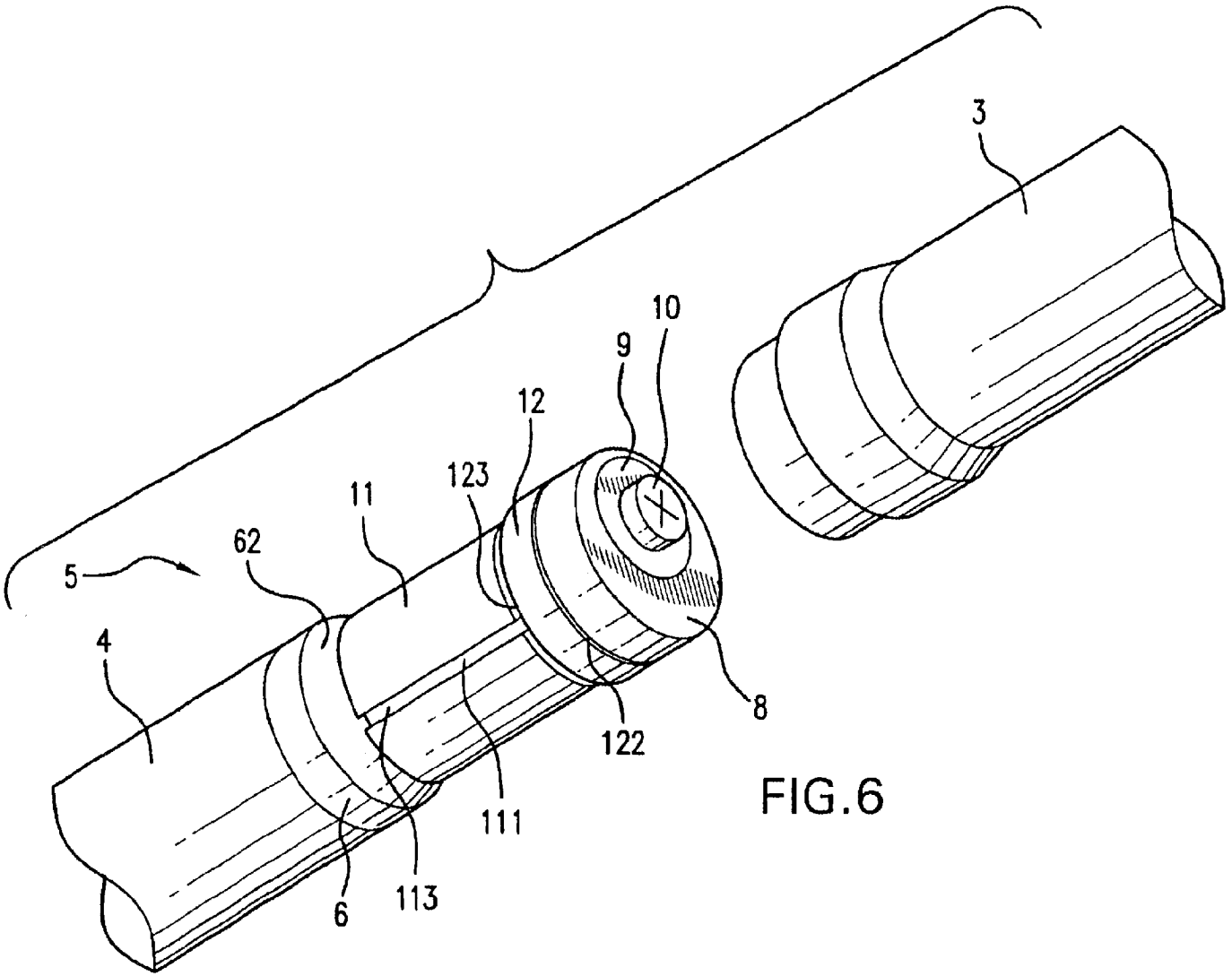
FIG. 6 is a diagram showing the second embodiment of the present invention.
Figure 7:
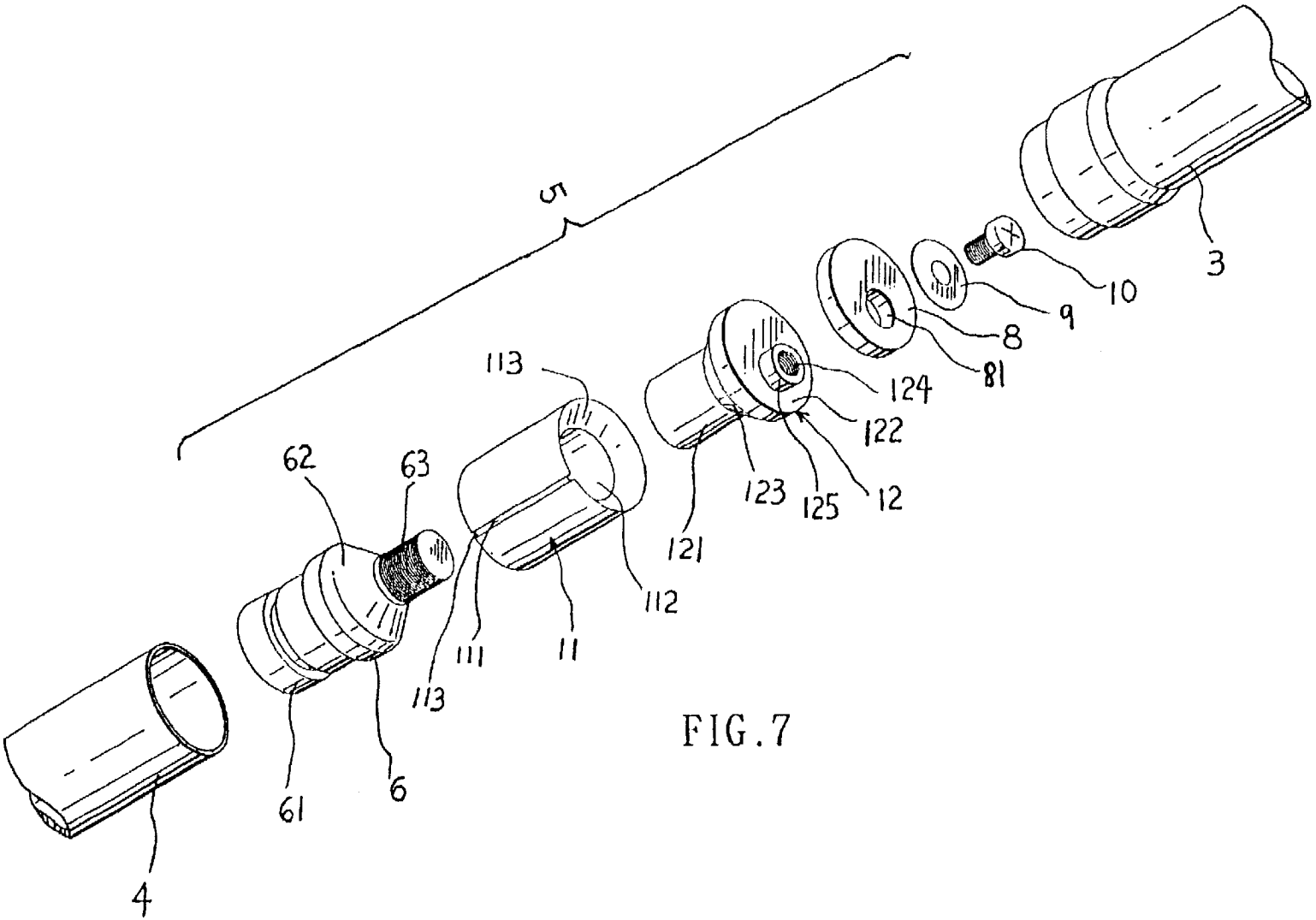
FIG. 7 is a perspective diagram showing the exploded components of the second embodiment thereof.
Figure 8:
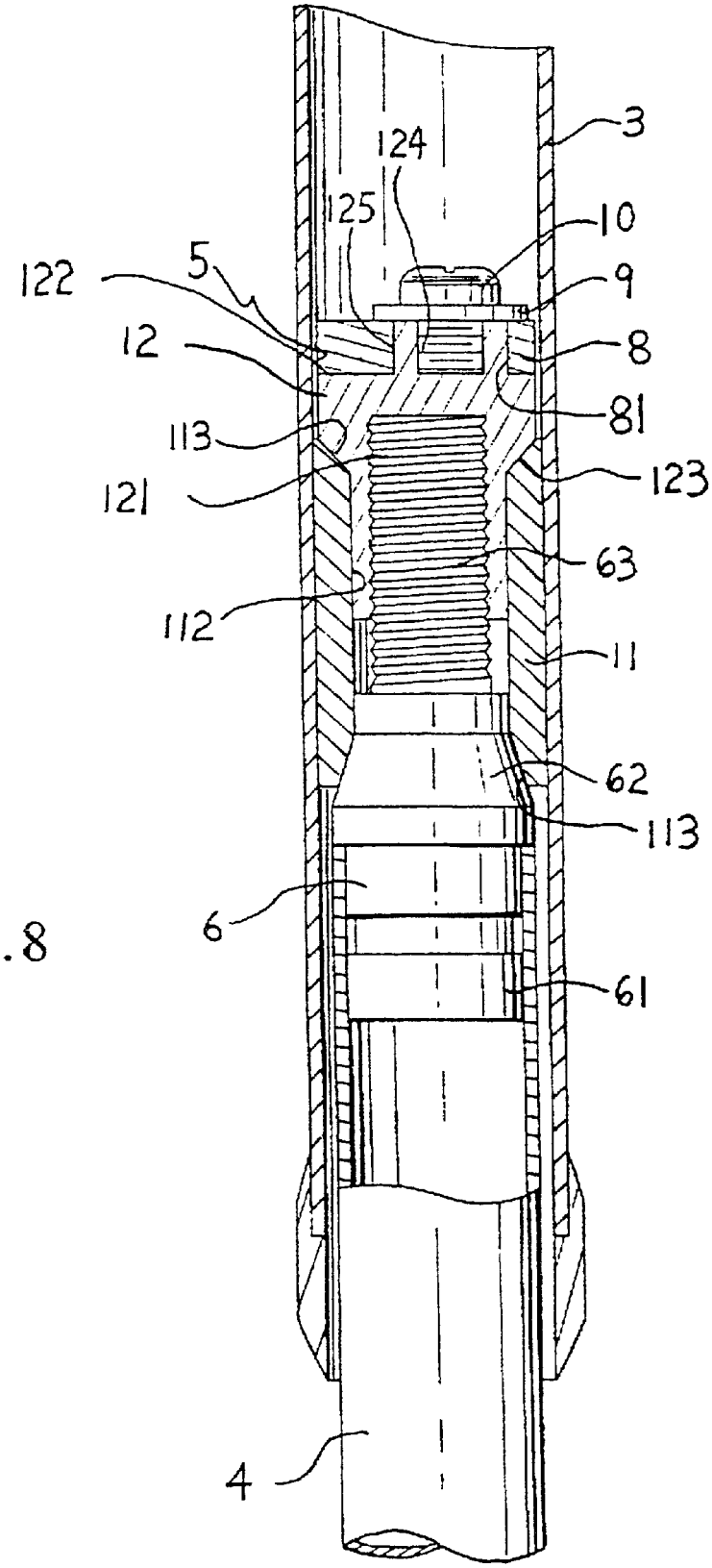
FIG. 8 is a sectional diagram showing the operation of the second embodiment thereof.
Figure 9:
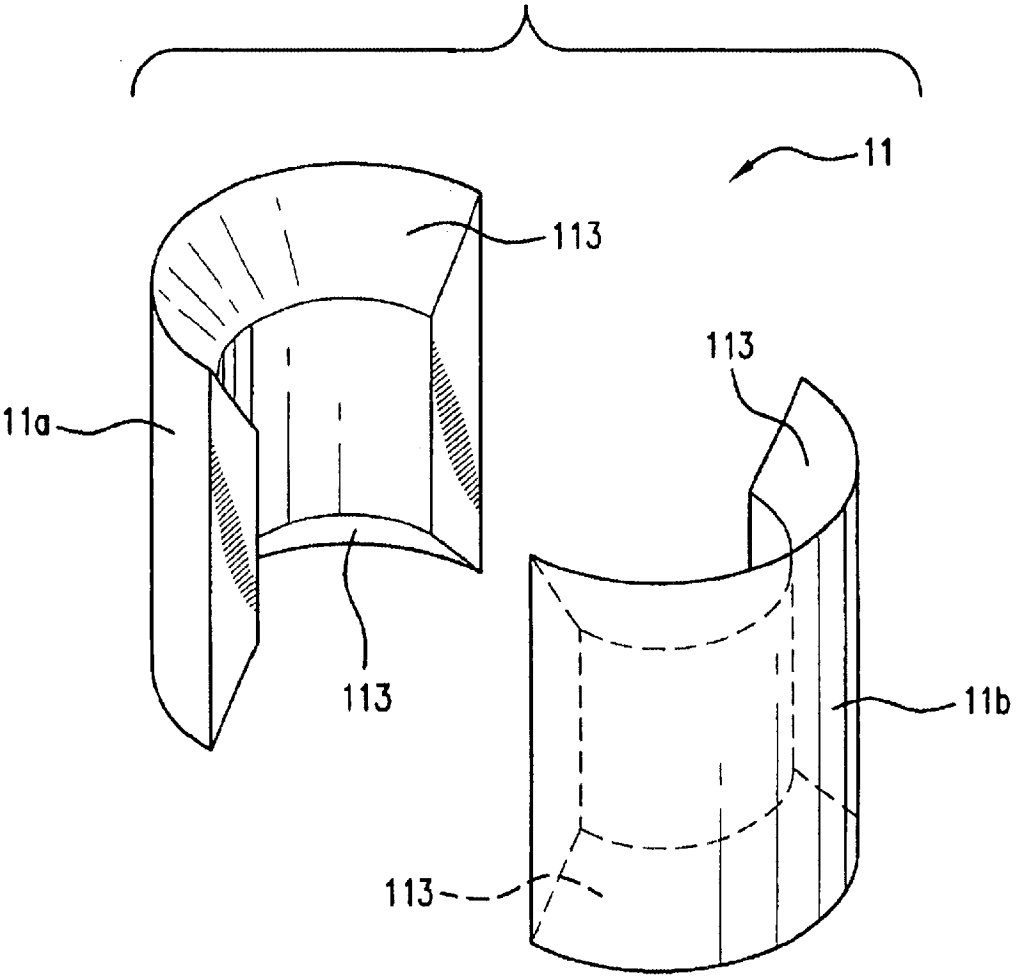
FIG. 9 is a perspective diagram showing the plastic locking tube having a longitudinal split opening.
Figures 10, 10A:
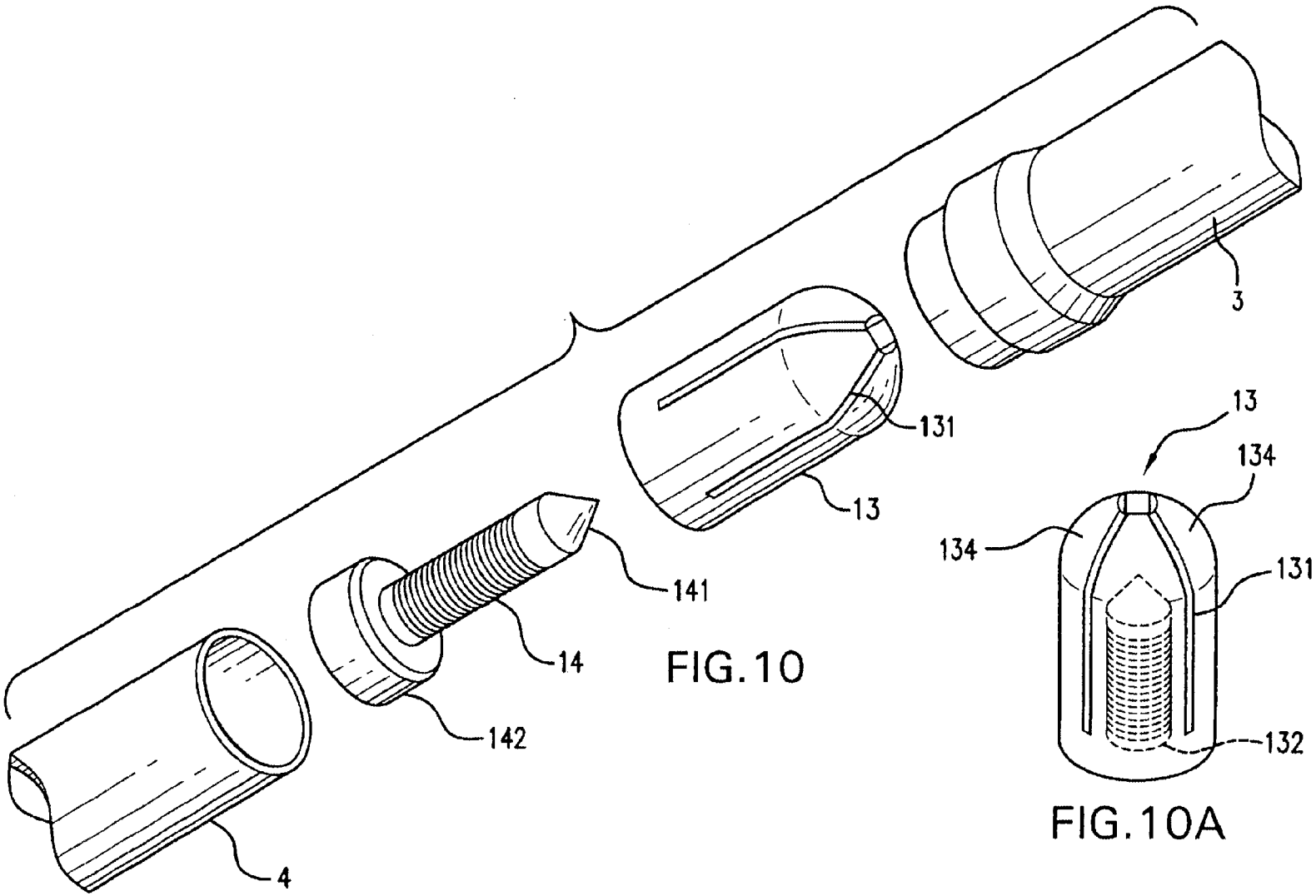
FIG. 10 is a perspective diagram showing the exploded components of the third embodiment thereof.
FIG. 10a is a perspective view showing the plastic retainer cap of the present invention.

Referring to FIGS. 6, 7, a second embodiment of the present invention is equipped with a position retaining device 5 having a circular disk 8 with an eccentric hole 81 and secured to an eccentrically operated retainer 12. The retainer 12 having an eccentric securing plate 122 for the fixing of the circular disk 8 by a screw 10. The retainer 12 has a conically tapered face 123 with an innerly threaded tubular extension 121 projected downwardly therefrom. On top of the securing plate 122 is erected a tubular protrusion 125 having a screw hole 124 for fixing the circular disk 8. A taper means 6 having a conically tapered face 62 and an outerly threaded post 63 extended therefrom is attached to the end of a lower pipe 4 by way of a joint block 61 and can adjustably engaged with the retainer 5. A plastic locking tube 11 having a longitudinally split opening 111 and a central hole 112 and a tapered periphery 113 at each end thereof is disposed between the eccentric retainer 12 and the taper means 6 whereby when the eccentric circular disk 8 and the retainer 12 bound together by way of the screw 10 and the washer 9 are housed in the upper pipe 3 of a walking stick the split plastic tube 11 will be forced to outwardly expand to abut tightly against the inner wall of the upper pipe 3 as a result of the taper means 6 secured to the lower pipe 4 proceeding forwardly due to the rotation of the lower pipe 4 by a person.

In other words, the eccentric circular disk 8 and the eccentric retainer 12 are designed to be in linear alignment with each other but the eccentric circular disk 8 and the securing plate 122 of the retainer 12 are made to separately abut firmly against the inner wall of the upper pipe 3 when the lower pipe 4 is rotated to make the outerly threaded post 63 of the taper means 6 engaged with the linearly threaded tubular extension 121, making the eccentric circular disk 8 and the eccentric retainer 12 rotated out of linear alignment, as shown in FIG. 5b, to abut tightly against the inner wall of the upper pipe 3, guaranting the taper means 6 to be able to effectively proceed forwardly into the plastic locking tube 11 to make the same outwardly expanded.

Figure 12:
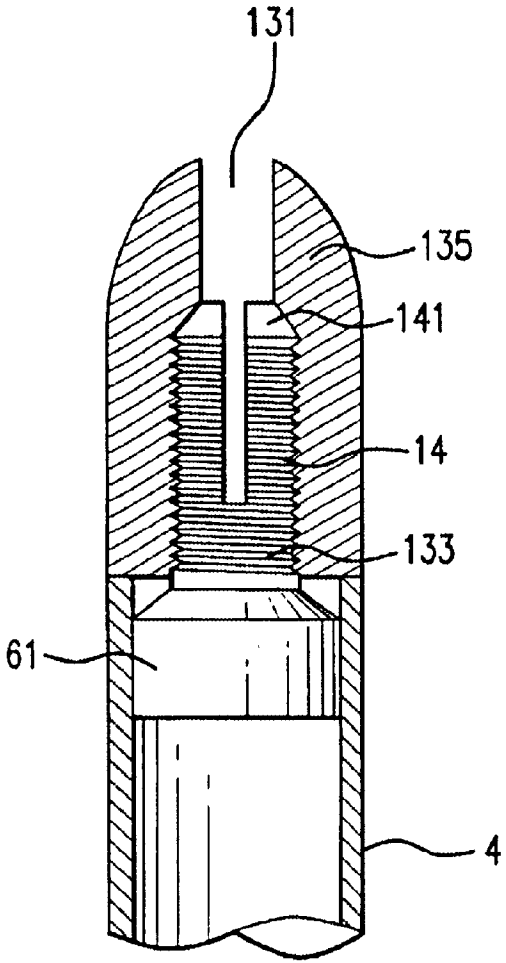
FIG. 12 is a sectional diagram showing the operation of tapered end of the threaded post moving against the split top end to make the retainer cap outwardly expand.
Figure 11:
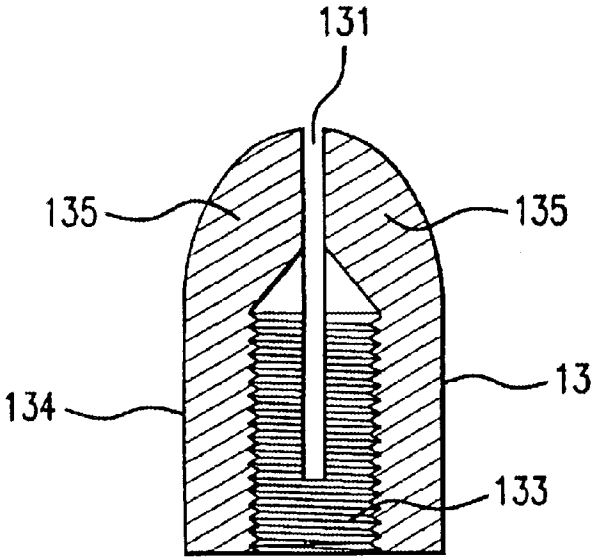
FIG. 11 is a sectional diagram showing the inner structure of the plastic retainer cap.

Referring to FIGS. 9, 10, 10a, 11, the third embodiment of the present invention is equipped with a plastic retainer cap 13 having a tubular passage [133] *132*. The plastic retainer cap 13 is divided into four symmetric portions 134 by two orthogonally defined splitting cuts 131. The tubular passage 132 is provided with inner threads 133 on the wall thereof so as to permit a threaded post 14 having a tapered end 141 and secured to the top end of the lower pipe 4 by the joint block 142 to be rotatably engaged with the plastic retainer cap 13. The innerly threaded tubular passage 132 extends most of the plastic retainer cap 13 with a section 135 thereof, adjacent the. four-portion split top end, left blank whereby when the tapered end 141 of the threaded post 14 is made to move forwardly as a result of the rotation of the lower pipe 4, the four split portions 134 of the plastic retainer cap 13 are urged to outwardly expand to firmly abut against the inner wall of the upper pipe 3 so as to lock the lower pipe 4 in position to the upper pipe 3 after a suitable length of the walking stick is selected. *The action of the split portions being urged outwardly is shown in FIGS. 11 and 12.*

I claim:

[1. A stagelessly adjustable telescopic walking stick having a position retaining device, comprising:

an upper pipe;

a lower pipe;

a taper means having a joint block disposed at one end and a conic tapered face in connection to an outerly threaded post disposed at the other end being secured to one end of said lower pipe;

a retainer having a round securing plate at one end and a semi-cylindrical extension having an innerly threaded half passage projecting downwardly therefrom and an otters groove defined on the periphery of the semi-cylindrical extension;

a conically tapered face defined at the end of said semi-cylindrical extension;

another semi-cylindrical portion in conformance to said semi-cylindrical extension having an outer groove defined in correspondence to said outer groove of said semi-cylindrical extension and an innerly threaded half passage and a conically tapered face at one end;

a C-shaped clamp ring being disposed in the outer groove of said semi-cylindrical extension and said semi-cylindrical portion to lock them together so as to form an expandable plastic tube having an innerity threaded passage and a conically tapered end;

an eccentric engagement protrusion having a screw hole being disposed at the top of said round securing plate;

a circular disk having an eccentric hole being secured to said round securing plate by way of a washer and a screw engaged with said screw hole of said eccentric engagement protrusion;

said retainer engaged with said eccentric circular disk at one end and connected to said outerly threaded post of said taper means at the other end being housed in said upper pipe;

said circular disk and said round securing plate being in linear alignment with each other when said taper means being not engaged with said ring clamped plastic tube, and becoming out of alignment with each other when said lower pipe being rotated along with said taper means, resulting in said round securing plate and said circular disk in tight abutment against the inner wall of said upper pipe to hold said retainer in place whereby said outerly threaded post of said taper means can proceed in said plastic tube of said retainer continually until said tapered face of said taper means becomes in abutment against said tapered face of said plastic tube to make said ring clamped plastic tube to outwardly expand, causing said plastic tube made up of said semi-cylindrical extension and portion to be in frictional contact to the inner wall of said upper pipe so as to lock said lower pipe to said upper pipe after a proper length of said walking stick is stageless adjusted.]

[2. A stagelessly adjustable telescopic walking stick having a position retaining device, comprising:

an upper pipe;

a lower pipe;

a taper means having a joint block disposed at one end and a conic tapered face in connection to an outerly threaded post disposed at the other end being secured to one end of said lower pipe;

a circular disk when an eccentric hole being secured to an eccentrically operated retainer;

said retainer having an eccentric securing plate for the fixing of said circular disk by a screw; and having a conically tapered face with an innerly threaded tubular extension projected downwardly therefrom;

on top of said securing plate being erected a tubular protrusion having a screw hole for fixing said circular disk;

said taper means being adjustably engaged with said retainer by way of said innerly threaded tubular extension;

a plastic locking tube having a longitudinally split opening and a central hole and a tapered periphery at each end thereof being disposed between said eccentric retainer and said taper means;

said circular disk and said round securing plate being in linear alignment with each other when said taper means being not engaged with said split plastic tube, and becoming out of alignment with each other when said lower pipe being rotated along with said taper means, resulting in said round securing plate and said circular disk in tight abutment against the inner wall of said upper pipe to hold said retainer in place whereby said outerly threaded post of said taper means can proceed in said plastic tube of said retainer continually until said tapered face of said taper means becomes in abutment against said taper face of said plastic tube to make said ring clamped plastic tube to outwardly expand, causing said plastic tube made up to be in frictional contact to the inner wall of said upper pipe so as to lock said lower pipe to said upper pipe after a proper length of the walking stick is stageless adjusted.]

3. A stagelessly adjustable telescopic walking stick having a position retaining device, comprising:

an upper pipe;

a lower pipe;

a taper means having a joint block disposed at one end and in connection to an outerly threaded post having a tapered end being secured to one end of said lower pipe by way of said joint block;

a retainer cap *disposed on the lower pipe, said retainer cap* divided into four equal portions by way of two orthogonally defined splitting cuts crisscrossed at the summit of said retainer cap having an innerly threaded passage terminating in a tapered end so that said outerly threaded post of said taper means can proceed in said passage all the way when said lower pipe is rotated to make said tapered end engaged with said tapered end of said passage to force said four split portions of said retainer cap to outwardly expand in frictional abutment against the inner wall of said upper pipe, resulting in the securing of said lower pipe to said upper pipe after a proper length of said walking stick is selected.

* * * * *